US007514024B2

(12) United States Patent
Matsumoto

(10) Patent No.: US 7,514,024 B2
(45) Date of Patent: Apr. 7, 2009

(54) METHOD FOR PRODUCING A POROUS SINTERED BODY OF CALCIUM PHOSPHATE-BASED CERAMIC

(75) Inventor: Toshio Matsumoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 560 days.

(21) Appl. No.: 10/772,398

(22) Filed: Feb. 6, 2004

(65) Prior Publication Data

US 2004/0185181 A1    Sep. 23, 2004

Related U.S. Application Data

(62) Division of application No. 10/005,673, filed on Dec. 7, 2001, now abandoned.

(30) Foreign Application Priority Data

Dec. 7, 2000    (JP)    ............................... 2000-373600

(51) Int. Cl.
    *B05D 3/02*      (2006.01)
(52) U.S. Cl. .............................. 264/42; 264/43; 264/44
(58) Field of Classification Search .............. 264/42–44
See application file for complete search history.

(56) References Cited

U.S. PATENT DOCUMENTS

| 4,795,764 | A | * | 1/1989 | Alm et al. .................... 521/107 |
| 4,798,585 | A | | 1/1989 | Inoue et al. |
| 4,889,670 | A | * | 12/1989 | Gurak et al. .................. 264/50 |
| 4,919,751 | A | | 4/1990 | Sumita et al. |
| 5,017,518 | A | | 5/1991 | Hirayama et al. |
| 5,030,611 | A | | 7/1991 | Ogawa et al. |
| 5,055,307 | A | | 10/1991 | Ysuru et al. |
| 5,064,436 | A | | 11/1991 | Ogiso et al. |
| 5,158,756 | A | | 10/1992 | Ogawa et al. |
| 5,171,720 | A | | 12/1992 | Kawakami |
| 5,215,941 | A | | 6/1993 | Yasukawa |
| 5,240,659 | A | * | 8/1993 | Ichitsuka et al. ............ 264/639 |
| 6,203,574 | B1 | | 3/2001 | Kawamura |
| 6,340,648 | B1 | * | 1/2002 | Imura et al. ................... 501/80 |
| 6,719,989 | B1 | | 4/2004 | Matsushima et al. |

(Continued)

FOREIGN PATENT DOCUMENTS

EP      0253506      6/1987

(Continued)

OTHER PUBLICATIONS

Temperature and Surface Tension, Ask a Scientist, retrieved from http://www.newton.dep.anl.gov/askasci/gen01/gen01725.htm on Apr. 30, 2007, 1 page.*

(Continued)

*Primary Examiner*—Carlos Lopez
(74) *Attorney, Agent, or Firm*—Greenblum & Bernstein P.L.C.

(57) ABSTRACT

A porous sintered body of a calcium phosphate-based ceramic having a porosity of 80% or more. The porous sintered body is produced by a method comprising the steps of: (1) preparing a slurry comprising a calcium phosphate-based ceramic powder, a water-soluble high molecular compound and a nonionic surface active agent; (2) stirring the slurry vigorously to froth the slurry; (3) solidifying the frothed slurry into a gel; and (4) drying and sintering the gel.

11 Claims, 1 Drawing Sheet

U.S. PATENT DOCUMENTS

2002/0104602 A1    8/2002    Arai et al.
2007/0072009 A1*   3/2007    Matsumoto et al. ......... 428/701

FOREIGN PATENT DOCUMENTS

| EP | 0278583 | 2/1988 |
|---|---|---|
| GB | 2078696 | 1/1982 |
| GB | 2142919 | 1/1985 |
| GB | 2192389 | 1/1988 |
| GB | 2348872 | 10/2000 |
| JP | 62-158175 | 7/1987 |
| JP | 63-040782 | 12/1988 |
| JP | 03-131580 | 6/1991 |
| JP | 3058174 | 4/2000 |
| WO | 98/15505 | 4/1998 |

OTHER PUBLICATIONS

Surface Tension, retrieved from http://www.du.edu/~jcalvert/phys/surftens.htm on Apr. 30, 2007, 3 pages.*

Information Offer Form filed Aug. 4, 2004 with the Japanese Patent Office, accompanied by an English language translation.

Notification received from the Japanese Patent Office dated Sep. 6, 2004, accompanied by an English language translation.

I Derwent Abstract 1985-220756 of JP 60-142847 which published Jul. 1985.

* cited by examiner

METHOD FOR PRODUCING A POROUS SINTERED BODY OF CALCIUM PHOSPHATE-BASED CERAMIC

CROSS-REFERENCE TO RELATED APPLICATIONS

This application is a divisional of application Ser. No. 10/005,673, filed Dec. 7, 2001, now abandoned, and which claims priority of Japanese Application No. 2000-373600, filed Dec. 7, 2000. The entire disclosures of application Ser. No. 10/005,673 and Japanese Application No. 2000-373600 are considered as being part of the disclosure of this application, and the entire disclosures of application Ser. No. 10/005,673 and Japanese Application No. 2000-373600 are expressly incorporated by reference herein in their entirety.

BACKGROUND OF THE INVENTION

The present invention relates to a porous sintered body of a calcium phosphate-based ceramic and a method for producing the porous sintered body. The porous sintered body is useful as a carrier for cultivation of cells or biological tissues and as a biocompatible artificial material suitable for filling a defective part of a bone, etc., and further, the porous sintered body is excellent in mechanical strength and machinability to be usable as a filler for a liquid chromatography, a catalyst-carrier, an electric or electronic material, a nuclear reactor material, a ceramic heating element, etc.

Calcium phosphate-based ceramic such as hydroxyapatite has an excellent biocompatibility to have been used as a carrier for cultivation of cells or biological tissues, a biomaterial such as an artificial dental root and a bone-reinforcing material, etc. It is preferred that the calcium phosphate-based ceramic is compact from the viewpoint of a mechanical strength. However, it is preferred that the calcium phosphate-based ceramic is porous, thus, that a porosity of the calcium phosphate-based ceramic is as high as possible from the viewpoint of a biocompatibility. Therefore, various methods have been proposed to produce the porous calcium phosphate-based ceramic, for example, frother methods, pyrolytic resin beads methods, spongy resin impregnation methods, water-soluble high molecular compound gelation methods, etc.

In the frother methods, to a slurry of hydroxyapatite, etc. is added a frother such as hydrogen peroxide water to froth the slurry, thereby increasing the porosity of the calcium phosphate-based ceramic. However, there is a limit in the porosity, and it is difficult to control an average pore-diameter and the porosity regularly in every lot in the frother methods. In the pyrolytic resin beads methods, pyrolytic resin beads are added to a slurry of hydroxyapatite, etc., mixed and formed therewith, and the resultant formed body is heated to burn down the pyrolytic resin beads, thereby producing the porous calcium phosphate-based ceramic. However, the pyrolytic resin beads methods are disadvantageous in that the formed body is often warped or cracked because the pyrolytic resin beads are not constricted in a drying process. Further, a large quantity of the pyrolytic resin beads is used in the methods, whereby long period of time is required in sintering and a large quantity of carbon dioxide gas is unavoidably provided. Furthermore, the porosity of the porous calcium phosphate-based ceramic produced by the pyrolytic resin beads methods is approximately equal to but no more than 50%. The spongy resin impregnation methods have been widely used to produce the porous calcium phosphate-based ceramic, the porosity of the porous calcium phosphate-based ceramic produced thereby depends on a porosity of the spongy resin to be approximately 75% at most. Therefore, the porous calcium phosphate-based ceramic having desired minute pores cannot be produced by the spongy resin impregnation methods.

In the water-soluble high molecular compound gelation methods, a slurry comprising a ceramic and a water-soluble high molecular compound is stirred to froth the slurry, the frothed slurry is heated for gelation, and the resultant gel containing air babbles is dried to provide a porous ceramic as disclosed in Japanese Patent No. 3058174. The porous ceramic produced by a method described in Japanese Patent No. 3058174 has spherical macro-pores resulting from the air babbles having a pore diameter of 20 to 2000 μm and three dimensional passing-through pores formed by gaps between spherical secondary particles composed of an aggregate of primary particles of the ceramic raw material. However, under a circumstances where the porous calcium phosphate-based ceramic have been required to be further improved in the biocompatibility, there has been increasing need for the porous calcium phosphate-based ceramic having a further high porosity.

OBJECT AND SUMMARY OF THE INVENTION

Accordingly, an object of the present invention is to provide a porous sintered body of a calcium phosphate-based ceramic that has a porosity higher than that of conventional calcium phosphate-based ceramic, and a method for producing the porous sintered body.

As a result of intense research in view of the above object, the inventor has found that a porous sintered body of a calcium phosphate-based ceramic superior in high porosity to conventional calcium phosphate-based ceramic can be obtained by adding a nonionic surface active agent to a slurry comprising a calcium phosphate-based ceramic powder and a water-soluble high molecular compound and by stirring the slurry vigorously. The present invention has been accomplished by the finding.

Thus, a porous sintered body of a calcium phosphate-based ceramic according to the present invention has a porosity of 80% or more.

The porous sintered body of the calcium phosphate-based ceramic according to the present invention preferably has an average pore-diameter of 5 to 1500 μm. A weight ratio of Ca/P in the calcium phosphate-based ceramic is preferably 1.6 to 1.7. A preferred embodiment of the porous sintered body is a porous sintered hydroxyapatite.

A method of the present invention for producing a porous sintered body of a calcium phosphate-based ceramic having a porosity of 80% or more comprises the steps of: (1) preparing a slurry comprising a calcium phosphate-based ceramic powder, a water-soluble high molecular compound and a nonionic surface active agent; (2) stirring the slurry vigorously to froth the slurry; (3) solidifying the frothed slurry into a gel; and (4) drying and sintering the gel.

The calcium phosphate-based ceramic powder is preferably a secondary particle having an average particle diameter of 0.5 to 80 μm derived from a primary particle having an average particle diameter of 100 nm or less. The water-soluble high molecular compound is preferably a cellulose derivative such as methylcellulose, carboxymethylcellulose, etc. Further, the nonionic surface active agent is preferably a fatty acid alkanolamide surface active agent.

It is preferred that the slurry has a composition where 1 to 10 part by weight of the water-soluble high molecular compound and 1 to 10 part by weight of the nonionic surface active agent are used with 100 parts by weight of the calcium phosphate-based ceramic powder. A weight ratio of the total of the calcium phosphate-based ceramic powder, the water-soluble high molecular compound and the nonionic surface active agent is preferably 20 to 50 weight % based on 100 weight % of the slurry.

The slurry is preferably stirred under a stirring condition of 50 W/L or more to froth the slurry. Further, it is preferable that the slurry is stirred while passing a gas through the slurry to froth the slurry, examples of the gas including air, nitrogen gas, inert gases such as argon gas, etc. The slurry is preferably stirred at 5 to 20° C. to froth the slurry. Furthermore, it is preferred that the nonionic surface active agent is free of a metal ion and a sulfate group.

The method of the present invention is particularly preferably used for producing the porous sintered hydroxyapatite.

DETAILED DESCRIPTION OF THE PREFERRED EMBODIMENTS

Figure 1:
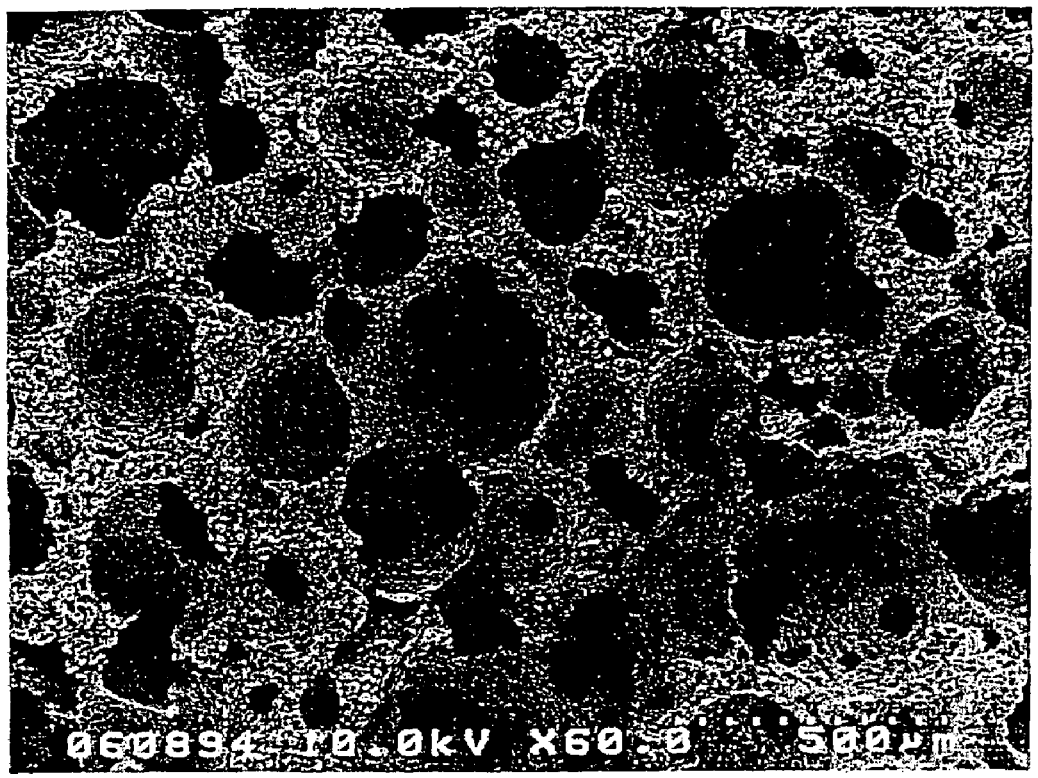
FIG. 1 is a scanning microscope photograph with a magnification of ×60 of a porous sintered hydroxyapatite body produced in Example 1.

[1] Porous Sintered Body of Calcium Phosphate-Based Ceramic (1) Composition

In a porous sintered body of a calcium phosphate-based ceramic according to the present invention, a weight ratio of Ca/P is preferably 1.6 to 1.7. When the weight ratio of Ca/P is less than 1.6, the calcium phosphate-based ceramic has a multi-phase structure containing tricalcium phosphate $Ca_3(PO_4)_2$. On the other hand, the weight ratio of more than 1.7 results in a multi-phase structure containing calcium oxide CaO. An preferred example of the porous sintered body of the present invention is a porous sintered hydroxyapatite $Ca_{10}(PO_4)_6\square(OH)_2$.

(2) Porosity

The porous sintered body of the calcium phosphate-based ceramic according to the present invention has a porosity of 80% or more. The porous sintered body having such a high porosity is achieved by the following method of the present invention for the first time. The porous sintered body has a high porosity to exhibit a remarkably high biocompatibility. The porosity is preferably less than approximately 95% from the viewpoint of practical use. If the porosity exceeds 95%, the porous sintered body is insufficient in a mechanical strength to be poor in workability and handling ability.

An average pore-diameter of the porous sintered body of the calcium phosphate-based ceramic is preferably 5 to 1500 μm. When the average pore-diameter is less than 5 μm, cells or blood vessels can hardly impregnate into the porous sintered body. On the other hand, when the average pore-diameter is more than 1500 μm, it is difficult to control the mechanical strength of the porous sintered body regularly so that the workability and the handling ability vary excessively in every lot. Pores in the porous sintered body preferably have a uniform pore-diameter, thus, it is particularly preferable that 80% or more of the pores have a diameter of 50 to 500 μm.

[2] Production Method

Explanations will be made for a method of the present invention in detail below taking production of a porous sintered hydroxyapatite body for instance, however, the scope of the present invention is not restricted thereby and the method can be similarly applied to other sintered bodies of calcium phosphate-based ceramic.

(1) Preparation of Slurry

A slurry comprising a hydroxyapatite powder, a water-soluble high molecular compound and a nonionic surface active agent is prepared.

(a) Hydroxyapatite Powder

The hydroxyapatite powder is preferably a secondary particle having an average particle diameter of 0.5 to 80 μm derived from a primary particle having an average particle diameter of 100 nm or less. The hydroxyapatite powder is preferably spherical from the viewpoint of improving stir of the slurry and formability of a porous hydroxyapatite green block.

It is preferred that the hydroxyapatite powder is subjected to a burning treatment to obtain powder strength sufficient for vigorous stirring. The burning treatment may be achieved by heating the hydroxyapatite powder at 700 to 850° C. for 4 to 10 hours. The burning temperature of less than 700° C. results in insufficient increase of the strength of the hydroxyapatite powder. When the burning temperature is higher than 850° C., the hydroxyapatite powder is sintered, whereby grain growth takes place and powdering is needed after the burning treatment.

(b) Water-Soluble High Molecular Compound

The water-soluble high molecular compound used in this invention acts to change an aqueous liquid containing this compound into a gel state. The aqueous liquid is solidified into a gel by heating, etc. The water-soluble high molecular compound may be such that cannot be completely dissolved in water, and the aqueous liquid may be a solution, a dispersion, a colloidal solution, an emulsion or a suspension. Examples of the water-soluble high molecular compound include: cellulose derivatives such as methylcellulose and carboxymethylcellulose; polysaccharides such as curdlan; synthetic polymers such as polyvinylalcohol, poly(acrylic acid), polyacrylamide and polyvinylpyrrolidone; etc. Among them, preferred are cellulose derivatives, and particularly preferred is methylcellulose. An aqueous liquid of polyvinylalcohol may be changed into a gel by adding boric acid or borax.

(c) Nonionic Surface Active Agent

The nonionic surface active agent forms a lot of minute air babbles when the slurry is vigorously stirred, and acts to prevent the air babbles from breaking in the heating step for the gelation. In the case where the porous sintered hydroxyapatite body according to the present invention is semipermanently used in vivo as a biomaterial, it is preferable that the nonionic surface active agent is completely burnt down by sintering, thus, it is preferable that the nonionic surface active agent do not contain a metal ion such as sodium ion or a sulfate group, which are still existent after sintering.

Examples of the nonionic surface active agent used in the present invention include fatty acid alkanolamides, poly(oxyethylene alkyl ether carboxylates), poly(oxyethylene alkyl ethers) such as poly(oxyethylene octyl phenyl ether), etc. Among them, preferred are the fatty acid alkanolamide surface active agents such as N,N-dimethyldodecylamine oxide from the viewpoint of frothing properties in the presence of hydroxyapatite.

(d) Weight Ratio of Contents

The slurry preferably contains 1 to 10 part by weight of the water-soluble high molecular compound, 1 to 10 part by weight of the nonionic surface active agent and 100 parts by weight of the hydroxyapatite powder. When the weight ratio of the hydroxyapatite powder is too small in the slurry, relatively long period of time is needed in drying the gel. On the other hand, too large amount of the hydroxyapatite powder results in high viscosity slurry so that it becomes difficult to froth the slurry. Further, gelation of the slurry is difficult when the weight ratio of the water-soluble high molecular compound is less than 1 part by weight to 100 parts by weight of the hydroxyapatite powder, and more than 10 parts by weight of the water-soluble high molecular compound results in high viscosity slurry so that it becomes difficult to froth the slurry. More preferred weight ratio of the water-soluble high molecular compound is 1 to 5 part by weight based on 100 parts by weight of the hydroxyapatite powder. Furthermore, it is difficult to froth the slurry when the weight ratio of the nonionic surface active agent is less than 1 part by weight to 100 parts by weight of the hydroxyapatite powder, and further improved effects of the nonionic surface active agent is not obtained if it is used in an excess amount of more than 10 parts by weight. More preferred weight ratio of the nonionic surface active agent is 1 to 5 part by weight based on 100 parts by weight of the hydroxyapatite powder.

A weight ratio of the total of the hydroxyapatite powder, the water-soluble high molecular compound and the nonionic surface active agent is preferably 20 to 50 weight % in 100 weight % of the slurry. When the weight ratio is less then 20 weight %, too long period of time is required in drying after gelation and the gel is often crushed after drying, failing to maintain the porous structure. On the other hand, when the weight ratio is more then 50 weight %, the viscosity of the slurry is too high, whereby it becomes difficult to froth the slurry by stirring. The weight ratio is more preferably 25 to 40 weight %.

(2) Frothing

The slurry froths while catching air when the above-mentioned slurry is stirred vigorously. The slurry is preferably stirred under a stirring condition of 50 W/L or more to froth. If the stirring condition is less then 50 W/L, the slurry is not sufficiently frothed so that the porous hydroxyapatite having a desired porosity cannot be produced. Incidentally, the stirring condition means "[maximum output of stirring apparatus (W)/amount of slurry (L)]×(actual rotational frequency/maximum rotational frequency)". When the viscosity of the slurry is increased, the output of the stirring apparatus is generally increased to maintain a predetermined rotational frequency. In the present invention, the slurry is frothed such that the porosity of the sintered hydroxyapatite body is remarkably increased and the viscosity of the slurry is not substantially changed since the preparation thereof, whereby the effect of the viscosity may be substantially disregarded.

As the stirring apparatus providing the above stirring condition, an impeller-type homogenizer may be used. Although the impeller-type homogenizer is generally designed not to froth the slurry, etc., the slurry can be remarkably frothed if the stirring condition is 50 W/L or more. Further, a stirring apparatus preferably used in the present invention is such that has a structure where a stirring blade is in shape of a disk, saw blade-like convexoconcave is provided at a circumference part of the stirring blade, and a baffle plate is disposed on the inner wall of a stirring chamber. Examples of the impeller-type homogenizer having such a structure include PH91, PA92, HF93, FH94P, PD96 and HM10 manufactured by SMT Co., Ltd., etc. Further, it is preferable that the slurry is stirred while passing a gas therethrough to promote frothing, examples of the gas including air, nitrogen gas, inert gases such as argon gas, etc.

Stirring period, which is depends on the stirring condition, may be approximately 1 to 30 minute. It is preferable that stirring temperature (temperature of the slurry) is relatively low to make the air babbles minute, uniform and stable, and specifically, the stirring temperature is preferably approximately 0 to 25° C., particularly preferably 5 to 20° C.

The frothed slurry is preferably cast by a mold having a flexible water-resisting film at the inner wall thereof. In this case, the flexible water-resisting film is peeled off from the mold with shrinkage of the ceramic while drying, whereby the ceramic is prevented from deformation of a surface in contact with the mold or cracking of an inner portion to provide the dried body with excellent quality.

(3) Gelation

When the slurry that is sufficiently frothed by stirring is heated, the water-soluble high molecular compound such as methylcellulose acts to change the slurry into a gel. The heating temperature is generally in the range of 80° C. to less than 100° C. Less than 80° C. of the heating temperature results in insufficient gelation, and water in the slurry boils to destruct the gel structure when the heating temperature is 100° C. or more.

(4) Drying

The gel is preferably dried at a high temperature such that water in the gel do not boils, for example, the temperature may be in the range of 80° C. to less than 100° C. The gel is isotropicaly shrunk by drying, the air babbles being not changed, whereby the dried body (green block) that is high in strength and has minute, uniform, spherical macro-pores is provided without cracking.

(5) Cutting

Because the water-soluble high molecular compound in the green block acts as a binder, the green block has a mechanical strength sufficient for handling. Thus, the dried green block can be cut or worked into a desired shape without provisional burning treatment.

(6) Degreasing

The green block cut into a predetermined shape may be subjected to a degreasing treatment to remove the water-soluble high molecular compound and the nonionic surface active agent therefrom if necessary. The green block may be degreased by heating at 300 to 900° C.

(7) Sintering

The green block is generally sintered at 1000 to 1250° C. for 2 to 10 hours. When the sintering temperature is less than 1000° C., the resultant porous sintered hydroxyapatite body is insufficient in strength. On the other hand, when the sintering temperature is more than 1250° C., hydroxyapatite is decomposed into tricalcium phosphate and calcium oxide. Sintering period may be appropriately selected in accordance with the sintering temperature. In the case where the degreasing treatment is not carried out, the green block may be gradually heated to the sintering temperature so that the green block is subjected to both of degreasing and sintering. For example, it is preferable that the green block is gradually heated from room temperature to approximately 600° C. at a heating rate of approximately 10 to 100° C./hour, it is then heated to the sintering temperature at a heating rate of approximately 50 to 200° C./hour, and the sintering temperature is maintained. The green block may be subjected to annealing or slow cooling after sintering.

EXAMPLES

The present invention will be explained in further detail by the following examples without intention of restricting the scope of the present invention defined by the claims attached hereto.

Example 1

120 parts by weight of spherical hydroxyapatite powder having an average diameter of 10 μm, which is composed of long thin primary particles having an average particle diameter of 78 nm in the major axis and 23 nm in the minor axis; 320 parts by weight of an aqueous solution containing 1 weight % of methylcellulose manufactured by Wako Pure Chemical Industries, Ltd., an aqueous solution containing 2 weight % of the methylcellulose exhibiting a viscosity of 4000 cps at 20° C.; and 10 parts by weight (solid content) of N,N-dimethyldodecylamine oxide "AROMOX" manufactured by LION CORPORATION used as a fatty acid alkanolamide surface active agent were mixed to prepare a slurry. The slurry was put into a homogenizer "PA92" manufactured by SMT Co., Ltd. Then, the slurry was vigorously stirred for 5 minutes under a stirring condition of 60 W/L (actual output in the stirring process) while maintaining the temperature of the slurry at 8° C. to froth the slurry.

The resultant slurry that contained air babbles was put into a mold and heated at 83°C. for 2 hours to provide a gel. The gel was then completely dried at 83° C. to produce a green block.

The green block was cut into a shape of 30 mm×15 mm×10 mm, heated from room temperature to 600° C. at a heating rate of 50° C./hour in the air, heated to 1200° C. at a heating rate of 100° C./hour, sintered at 1200° C. for 4 hours, cooled down to 600° C. at a cooling rate of 50° C./hour, maintained at 600° C. for 4 hours, and cooled down to room temperature at a cooling rate of 100° C./hour, to produce a porous sintered hydroxyapatite body according to Example 1.

Porosity of the resulting porous sintered hydroxyapatite body was measured. The result was shown in Table 1 with a composition of raw materials in the slurry. Further, a scanning microscope photograph with a magnification of ×60 of the porous sintered hydroxyapatite body was shown in FIG. 1. As shown in FIG. 1, pores in the porous sintered hydroxyapatite body of Example 1 were uniform in size, most of them having a pore diameter of 50 to 500 μm.

Example 2

A porous sintered hydroxyapatite body according to Example 2 was produced in the same manner as Example 1 except that the slurry was vigorously stirred while passing nitrogen gas therethrough from a pipe disposed on bottom of the homogenizer to froth the slurry. Porosity of the resulting porous sintered hydroxyapatite body was measured. The result was shown in Table 1 with a composition of raw materials in the slurry.

Comparative Example 1

A porous sintered hydroxyapatite body according to Comparative Example 1 was produced in the same manner as Example 1 except that 140 parts by weight of the hydroxyapatite powder used in Example 1 was added to 240 parts by weight of an aqueous solution containing 1 weight % of methylcellulose having a temperature of 20° C. to prepare a slurry and that this slurry was stirred for 15 minutes under a stirring condition of 5.5 W/L (actual output in the stirring process) by "KENMIX mixer" manufactured by Aicohsha Manufacturing Co., Ltd. to froth the slurry before gelation. Porosity of the resulting porous sintered hydroxyapatite body was measured. The result was shown in Table 1 with a composition of raw materials in the slurry.

TABLE 1

| | Composition (Part by Weight) | | | |
|---|---|---|---|---|
| Ex. No. | Hydroxyapatite Powder | Methylcellulose Aqueous Solution | Surface Active Agent (AROMOX) | Porosity (%) |
| Ex. 1 | 120 | 320 | 10 | 85.6 |
| Ex. 2 | 120 | 320 | 10 | 93.2 |
| Comp. Ex. 1 | 140 | 240 | — | 70.3 |

As shown in Table 1, the porous sintered hydroxyapatite bodies of Examples 1 and 2 were produced by the method according to the present invention comprising the steps of adding the nonionic surface active agent to the slurry and frothing the slurry under the vigorous stirring condition to exhibit porosity remarkably higher than that of the porous sintered hydroxyapatite body of Comparative Example 1 produced under the stirring condition of 5.5 W/L without the nonionic surface active agent. The porous sintered hydroxyapatite body of Example 2, which was produced by a method using nitrogen gas in the frothing process, was further excellent in porosity as compared with Example 1.

Examples 3 and 4

Porous sintered hydroxyapatite bodies according to Examples 3 and 4 were produced in the same manner as Example 1 except that a homogenizer "HM10" manufactured by SMT Co., Ltd. was used instead of the homogenizer "PA92" and that a slurry having a composition shown in Table 2 was stirred under conditions shown in Table 2 to froth the slurry, respectively. Incidentally, "Actual Output of Stirring Apparatus" in Table 2 corresponded to the stirring condition. Further, porosity of each porous sintered hydroxyapatite bodies was measured. The results were shown in Table 2.

Comparative Example 2

A porous sintered hydroxyapatite body according to Comparative Example 2 was produced in the same manner as Example 1 except that the nonionic surface active agent was not used, that the "KENMIX mixer" was used instead of the homogenizer "PA92" and that a slurry having a composition shown in Table 2 was stirred under conditions shown in Table 2 to froth the slurry. Further, porosity of the resulting porous sintered hydroxyapatite body was measured. The result was shown in Table 2.

TABLE 2

| | Ex. 3 | Ex. 4 | Comp. Ex. 2 |
|---|---|---|---|
| Methylcellulose 1% Aqueous Solution | 4000 g | 2000 g | 1975 g |
| Hydroxyapatite Powder | 1600 g | 800 g | 850 g |
| Surface Active Agent | AROMOX 40 g | AROMOX 20 g | — |
| Stirring Apparatus | HM10 | HM10 | KENMIX |

TABLE 2-continued

|  | Ex. 3 | Ex. 4 | Comp. Ex. 2 |
|---|---|---|---|
| Rotational Frequency | 3000 rpm | 4000 rpm | 150 rpm |
| Stirring Period | 10 minutes | 10 minutes | 10 minutes |
| Maximum Output of Stirring Apparatus | 750 W | 750 W | 650 W |
| Actual Output of Stirring Apparatus | 188 W/L | 375 W/L | 329 W/L |
|  | 62.5 W/L | 166.7 W/L | 5.5 W/L |
| Porosity | 80.3% | 86.2% | 40.0% |

As shown in table 2, the porous sintered hydroxyapatite bodies of Examples 3 and 4 according to the present invention exhibited porosity of 80% or more in contrast with the porous sintered hydroxyapatite body of Comparative Example 2 exhibiting a low porosity of 40%.

Example 5

Porous sintered hydroxyapatite bodies were produced in the same manner as Example 1 except for changing the above slurry used in Example 1 to such that was prepared by mixing 120 parts by weight of spherical hydroxyapatite powder used in Example 1; 240 parts by weight of an aqueous solution containing 1 weight % of methylcellulose used in Example 1; and 2.4 parts by weight (solid content) of a surface active agent shown in Table 3, respectively. Porosity of each porous sintered hydroxyapatite bodies was measured. The results were shown in Table 4.

TABLE 3

Surface Active Agent

| Compound | Trade Name | Ionicity | Frothing Properties | Residue | Manufacturer |
|---|---|---|---|---|---|
| N,N-Dimethyldodecyl amine oxide | AROMOX | Nonionic | Very Good | (a) | Lion Corporation |
| Poly(oxyethylene octyl phenyl ether) | Triton X100 | Nonionic | Good | (a) | Wako Pure Chemical Industries, Ltd. |
| Lauric sulfuric acid triethanolamine | TEALS | Nonionic | Very Good | (b) | Nikko Chemicals Co., Ltd. |
| Poly(oxyethylene laurylamine) | POELA | Nonionic | Good | (a) | Nikko Chemicals Co., Ltd. |
| Poly(oxyethylene alkylcarboxylic acid) | EMULGEN LS110 | Anionic | Good | (a) | Kao Corporation |
| Poly(oxyethylene alkylcarboxylic acid) | EMULGEN 420 | Anionic | Good | (a) | Kao Corporation |

(a): Both of a metal ion and a sulfate group were not exist and only pyrolyzed residue of C, H, O, N, etc. was still existent in the porous sintered hydroxyapatite body after sintering.
(b): A metal ion and/or a sulfate group was still existent in the porous sintered hydroxyapatite body after sintering.

TABLE 4

| Surface Active Agent | | |
|---|---|---|
| Trade Name | Ionicity | Porosity |
| AROMOX | Nonionic | 91.0 |
| Triton X100 | Nonionic | 88.2 |
| TEALS | Nonionic | 85.6 |
| POELA | Nonionic | 80.7 |
| EMULGEN LS110 | Anionic | 73.9 |
| EMULGEN 420 | Anionic | 63.0 |

As shown in Table 4, the porous sintered hydroxyapatite bodies of the present invention produced from the slurry comprising the nonionic surface active agent had a high porosity of 80% or more, though the comparative porous sintered hydroxyapatite bodies produced from the slurry comprising the anionic surface active agent exhibited a low porosity. Further, in the case of using lauric sulfuric acid triethanolamine "TEALS" as the nonionic surface active agent, sulfate group was still existent in the porous sintered hydroxyapatite body after sintering though the frothing properties was remarkably excellent.

As described in detail above, a porous sintered body of a calcium phosphate-based ceramic according to the present invention has a porosity higher than that of conventional calcium phosphate-based ceramic to be excellent in biocompatibility, thereby being useful as a biomaterial. Further, the porous sintered body is excellent in a mechanical strength and a machinability to be usable as a filler for a liquid chromatography, a catalyst-carrier, an electric or electronic material, a nuclear reactor material, a ceramic heating element, etc.

In a method for producing such a porous sintered body according to the present invention, a nonionic surface active agent is added to a high viscosity slurry comprising a ceramic powder and a water-soluble high molecular compound and the slurry is stirred remarkably vigorously, whereby the porous sintered body having a high porosity can be effectively produced with minute, uniform pores. Furthermore, in the method of the present invention, the intermediate gel is isotropicaly shrunk by drying so that the dried body is provided without cracking to provide the porous sintered body of the calcium phosphate-based ceramic with ease. The present disclosure relates to subject matter contained in Japanese Patent Application No. 2000-373600 (filed on Dec. 7, 2000) which is expressly incorporated herein by reference in its entirety.

What is claimed is:

1. A method for producing a porous sintered body of a calcium phosphate-based ceramic having a porosity of 80% or more, wherein said method comprises: (1) preparing a slurry comprising a calcium phosphate-based ceramic powder, a water-soluble high molecular compound and a nonionic surface active agent; (2) stirring said slurry vigorously to froth said slurry; (3) solidifying the frothed slurry into a gel; (4) degreasing a green block having a predetermined shape formed from said gel to remove said water-soluble high molecular compound and said nonionic surface active agent from the gel by heating at 300 to 900° C.; and (5) sintering said green block after degreasing, wherein said nonionic surface active agent is N,N-dimethyldodecylamine oxide.

2. The method for producing a porous sintered body according to claim 1, wherein said calcium phosphate-based ceramic powder is a secondary particle having an average particle diameter of 0.5 to 80 μm prepared from a primary particle having an average particle diameter of 100 nm or less.

3. The method for producing a porous sintered body according to claim 1, wherein said water-soluble high molecular compound is a cellulose derivative.

4. The method for producing a porous sintered body according to claim 1, wherein 1 to 10 part by weight of said water-soluble high molecular compound and 1 to 10 part by weight of said nonionic surface active agent are used with 100 parts by weight of said calcium phosphate-based ceramic powder.

5. The method for producing a porous sintered body according to claim 1, wherein a weight ratio of the total of said calcium phosphate-based ceramic powder, said water-soluble high molecular compound and said nonionic surface active agent is 20 to 50 weight % based on 100 weight % of said slurry.

6. The method for producing a porous sintered body according to claim 1, wherein said slurry is stirred under a stirring condition of 50 W/L or more to froth said slurry.

7. The method for producing a porous sintered body according to claim 1, wherein said nonionic surface active agent is free of a metal ion and a sulfate group.

8. The method for producing a porous sintered body according to claim 1, wherein said slurry is stirred while passing a gas through said slurry to froth said slurry.

9. The method for producing a porous sintered body according to claim 1, wherein said calcium phosphate-based ceramic is hydroxyapatite.

10. A method for producing a porous sintered body of a calcium phosphate-based ceramic having a porosity of 80% or more, wherein said method comprises: (1) preparing a slurry comprising a calcium phosphate-based ceramic powder, a water-soluble high molecular compound and a nonionic surface active agent; (2) stirring said slurry vigorously to froth said slurry; (3) solidifying the frothed slurry into a gel; and (4) drying and sintering said gel, and wherein said nonionic surface active agent is N,N-dimethyldodecylamine oxide.

11. The method for producing a porous sintered body according to claim 1, wherein the gel is dried prior to degreasing.

* * * * *